(12) United States Patent
Horimai

(10) Patent No.: US 7,203,026 B2
(45) Date of Patent: Apr. 10, 2007

(54) MAGNETIC TAPE CARTRIDGE, SERVO WRITER, MAGNETIC TAPE DRIVE AND METHOD FOR READING SERVO SIGNAL

(75) Inventor: Kiyoshi Horimai, Odawara (JP)

(73) Assignee: Fujifilm Corporation, Tokyo (JP)

( * ) Notice: Subject to any disclaimer, the term of this patent is extended or adjusted under 35 U.S.C. 154(b) by 169 days.

(21) Appl. No.: 10/979,869

(22) Filed: Nov. 3, 2004

(65) Prior Publication Data
US 2005/0122615 A1 Jun. 9, 2005

(30) Foreign Application Priority Data
Dec. 1, 2003 (JP) ............... 2003-401586

(51) Int. Cl.
*G11B 5/584* (2006.01)
(52) U.S. Cl. ................. 360/77.12
(58) Field of Classification Search ............ 360/77.12, 360/75, 77.07, 53, 122; 375/341; 242/334.2; 428/847.7
See application file for complete search history.

(56) References Cited

U.S. PATENT DOCUMENTS

| | | | | |
|---|---|---|---|---|
| 4,163,532 A | * | 8/1979 | Sakai | 242/334.2 |
| 4,996,609 A | | 2/1991 | Joannou | |
| 5,055,951 A | * | 10/1991 | Behr | 360/77.12 |
| 5,291,348 A | * | 3/1994 | Copolillo | 360/77.07 |
| 5,311,380 A | * | 5/1994 | Murata et al. | 360/77.12 |
| 5,617,269 A | * | 4/1997 | Gordenker et al. | 360/77.12 |
| 5,689,384 A | | 11/1997 | Albrecht et al. | |
| 6,021,013 A | * | 2/2000 | Albrecht et al. | 360/53 |
| 6,169,640 B1 | | 1/2001 | Fasen | |
| 6,282,051 B1 | * | 8/2001 | Albrecht et al. | 360/75 |
| 6,320,719 B1 | * | 11/2001 | Albrecht et al. | 360/77.12 |
| 6,347,016 B1 | | 2/2002 | Ishida et al. | |
| 6,462,904 B1 | * | 10/2002 | Albrecht et al. | 360/122 |
| 6,767,610 B2 | * | 7/2004 | Takahashi et al. | 428/847.7 |
| 6,865,050 B2 | * | 3/2005 | Nakao et al. | 360/75 |
| 6,970,312 B2 | | 11/2005 | Yip et al. | |
| 6,970,522 B1 | * | 11/2005 | Morling et al. | 375/341 |
| 2005/0117246 A1 | * | 6/2005 | Sueki et al. | 360/77.12 |

FOREIGN PATENT DOCUMENTS

JP 8-30942 A 2/1996

* cited by examiner

*Primary Examiner*—Fred F. Tzeng
(74) *Attorney, Agent, or Firm*—Sughrue Mion, PLLC

(57) ABSTRACT

Disclosed are a magnetic tape cartridge and a servo writer which both allow a magnetic tape drive to recognize a level of a voltage signal being read from a servo signal. In a magnetic tape included in the magnetic tape cartridge, a servo signal that has been written on a servo band contains output level data indicating an output level of the servo signal itself. The magnetic tape drive reads the servo signal, then extracts the output level data therefrom, and adjusts the output level of the servo signal to a predetermined level.

21 Claims, 12 Drawing Sheets

VOLTAGE SIGNAL PRODUCED
UPON READING OF SERVO SIGNAL

MAGNETIC TAPE CARTRIDGE, SERVO WRITER, MAGNETIC TAPE DRIVE AND METHOD FOR READING SERVO SIGNAL

BACKGROUND OF THE INVENTION

1. Field of the Invention

Apparatuses and a method consistent with the present invention relate to a magnetic tape cartridge including a magnetic tape within on which servo signals are written, a servo writer for writing servo signals on a magnetic tape, a magnetic tape drive for recording/reproducing data on/from a magnetic tape, and a method for reading servo signals.

2. Description of the Related Art

In recent years, a high density recording design of magnetic tapes has advanced, and some of magnetic tapes for backup media of computers have a recording capacity of several hundreds of gigabytes. Magnetic tapes therefore have several hundreds of data tracks along the width thereof. Such a high density recording design involves excessive narrowing of the data tracks and of the intervals between the adjacent data tracks in a magnetic tape. Thus, in order to allow recording/reproducing devices of a magnetic head to trace such narrow data tracks, servo signals are written on a magnetic tape in advance, and the servo signals are then read by a magnetic head, while the position of the magnetic head relative to the magnetic tape (the position along the width of the magnetic tape) is servo-controlled (refer to Japanese Unexamined Patent Application No. 8-30942 (Paragraph No. 0016 and FIG. 1)).

The servo signals are written on corresponding non-magnetized servo bands on a magnetic tape by magnetizing the servo bands in one direction by use of a head of a servo writer, to which a record current is supplied. Specifically, in a conventional technique as shown in FIG. 11A, a record pulse current PC having positive pulses PP and zero pulses ZC is fed to a magnetic head as a record current, and servo signals SS are thereby recorded on non-magnetized servo bands on a magnetic tape. In use of this record pulse current PC, as shown in FIG. 11B, when the zero pulses ZC of the record pulse current PC is fed to the magnetic head, the magnetic head does not magnetize the servo patterns SP. Meanwhile, when the positive pulses PP are fed thereto, parts (servo patterns SP) of the servo bands SB are magnetized in one direction, due to leakage flux from servo gaps of the magnetic head. As a result, the servo signals SS are written on the corresponding servo bands. Each space between the servo bands SB adjacent to each other serves as a data band DB on which a data signal is to be written.

Each servo pattern SP is composed of bursts Ba and Bb. The burst Ba is a magnetized portion of two stripes, which are both inclined at a positive angle with respect to a running direction of the magnetic tape MT. The burst Bb follows the burst Ba, and is a magnetized portion of two stripes, which are both inclined at a negative angle. These servo patterns SP are repeatedly formed at predetermined intervals, thereby constituting the servo signal SS. In these servo patterns, some variations can be conceived as appropriate. For example, the bursts Ba and Bb maybe formed of five positive inclined stripes and five negative inclined stripes, respectively. Alternatively, the servo signal SS may be constituted of two types of servo patterns alternately repeated, one of which is formed of five positive inclined stripes and five negative inclined stripes, and the other of which is formed of four positive inclined stripes and four negative inclined stripes. Note that the servo patterns SP are enlarged relative to the magnetic tape MT in FIG. 11B for clarity.

A magnetic tape drive uses a servo signal sensing element (MR element) to sense a variation in magnetic force generated on the servo signal SS, based on a variation in an electric resistance of the servo signal sensing element itself, and outputs the sensed variation in a differential waveform (voltage value) Accordingly, as the variation in the electric resistance of the MR element is increased, the peak value of the voltage signal being read from the servo signal is higher, that is, the SN ratio of the voltage signal is enhanced. Specifically, if the variation in the magnetic force generated on the servo signal SS is increased, or if the servo signal sensing element (MR element) has a large sensing area, then the voltage signal RSL being read from the servo signal SS has a high peak value, as shown in FIG. 11C.

In the future, it is expected that magnetic tapes will develop to the extent that they will have a recording capacity of several tens of terabytes. As such high density recording designs proceed, the number of data tracks formed on a magnetic tape is increased, the width of data tracks and interval between data tracks adjacent to each other are further narrowed, and a magnetic tape itself is thinned. This involves weakening of a magnetic force sensed upon reading of servo signals, and a reduction in a variation thereof. This causes lowering of the peak value of the voltage signal being read from the servo signal SS, as show in FIG. 11D, and the SN ratio of the voltage signal is thus deteriorated. Consequently, a magnetic tape drive fails to read the servo signal SS correctly, and to exactly control the position of the magnetic head.

To overcome this disadvantage, a technique disclosed in JP 2003-110396 (non-published) has been conceived by this inventor. In this technique, as shown in FIG. 12A, a DC erase head (not shown) magnetizes the servo bands SB in one direction (forward direction) along the long side of the magnetic tape MT (DC magnetization) and, then records the servo signals SS on the servo bands SB by magnetizing the parts of the servo bands SB in the opposite direction (reverse direction). In this figure, the magnetized directions are denoted by small arrows. The level of the voltage signal, which is read from the servo signal SS by the servo signal sensing element, depends on the variation in the magnetic force at a border where the orientation of the magnetization is changed. In this case, the orientation of the magnetization is greatly changed from the forward to reverse directions at a border between the regions forwardly magnetized and reversely magnetized. Similarly, the orientation of the magnetization is also greatly changed from the forward to reverse directions at a border between the regions reversely magnetized and forwardly magnetized. Consequently, thanks to this large variation of the magnetic force, a high level of the voltage signal can be obtained, as shown in FIG. 12B. In other words, the SN ratio of the voltage signal can be improved.

However, the level of the voltage signal may be much higher or lower than that of a conventional thick magnetic tape that is not subjected to the DC magnetization. Concretely, if the level of a voltage signal obtained from the conventional magnetic tape is assumed to be 100%, then that obtained from the current magnetic tape may be 200% or 70%. This is quite difference from 100%. Upon occurrence of such a great difference, a conventional magnetic tape drive is hard to record/reproduce data on/from the magnetic tape MT being DC-magnetized.

A conventional magnetic tape drive has an AGC (auto gain controller) that fine-adjusts the variation in the voltage signal to an allowable range, and this AGC is designed to utilize the conventional level (100%) as a reference. If the adjustable range of an AGC is within ±50%, then the AGC can adjust the level of the voltage signal to be 100% even when the level is varied from 50 to 150%. A magnetic tape drive can therefore read the servo signals.

When a magnetic tape cartridge having DC magnetized servo bands SB is set at such a conventional magnetic tape drive, the drive recognizes that the servo bands SB are not DC magnetized. It is assumed that the average level of voltage signal of the DC magnetized magnetic tape cartridge is 70% relative to the conventional level. If this voltage level is varied over a range of ±50%, that is, 35% to 105%, then the lowest level is below 50% and, thus falls outside the adjustable range (50% to 150%) of an AGC. As a result, the magnetic tape drive may fail to read the servo signals. Next, it is assumed that the average level of the voltage signal is 200%. Even if this servo signals is normally read, the output level falls outside the adjustable range of an AGC. As a result, a magnetic tape drive may fail to read the servo signals, as well.

To solve the above problem, is requested, a magnetic tape drive which recognizes an output level of servo signals, and which adjusts the level to an allowable level. In the future, two types of magnetic tape cartridges, that is, a magnetic tape cartridge having DC-magnetized servo bands and a magnetic tape cartridge having non-DC-magnetized servo bands will be used in combination. In this case, the above magnetic tape drive is especially required.

An object of the present invention is to provide a magnetic tape cartridge and a servo writer which both allow a magnetic tape drive to recognize a level of a voltage signal being read from a servo signal.

Another object of the present invention is to provide a magnetic tape drive and a method for reading a servo signal, which both makes it possible to recognize a level of a voltage signal being read from a servo signal, and to adjust this level to an allowable level.

SUMMARY OF THE INVENTION

It is a first aspect of the present invention to provide a magnetic tape cartridge including a magnetic tape provided with a servo band, on which a servo signal for controlling tracking of a magnetic head is written, the servo signal containing output level data that indicates an output level of the servo signal itself. Further, the servo signal on the servo band includes pairs of linear patterns, each pair of which are not parallel to each other, and the output level data is produced in the servo signal by shifting respective positions of the pairs of linear patterns from one another along a long side of the magnetic tape, or by varying respective widths of the pairs of linear patterns.

Herein, the output level data is naturally information showing a number that represents the output level, such as 70%, and further, may be information indirectly showing the degree of the output level, such as information on whether the servo bands are DC-magnetized.

According to the first aspect, since the servo signal contains the output level data, a magnetic tape drive can recognize the output level of the servo signal upon reading of the servo signal. As a result, the magnetic tape drive can adjust the output level to an allowable level, based on the output level data, and thereby record/reproduce data on/from the magnetic tape cartridge excellently, regardless of whether the servo band is DC-magnetized.

It is a second aspect of the present invention to provide a magnetic tape cartridge including:
(a) a magnetic tape including a servo band, on which a servo signal for controlling tracking of a magnetic head is written; and
(b) a cartridge memory being a record medium different from the magnetic tape, and the cartridge memory on which output level data indicating an output level of the servo signal is written.

According to the second aspect, since the cartridge memory contains the output level data, a magnetic tape drive can recognize the output level of the servo signal upon reading of the servo signal. As a result, the magnetic tape drive can adjust the output level to an allowable level, based on the output level data, and thereby record/reproduce data on/from the magnetic tape cartridge excellently, regardless of whether the servo band is DC-magnetized.

It is a third aspect of the present invention to provide a servo writer including:
(a) a magnetic tape running system for running the magnetic tape, constituted of:
   a supply reel for feeding the magnetic tape; and
   a take-up reel for winding the magnetic tape being fed from the supply reel;
(b) a servo signal write head for writing the servo signal on the servo band of the magnetic tape, while being in contact with the magnetic tape;
(c) a controller for encoding the output level data indicating the output level of the servo signal; and
(d) a pulse generation circuit for receiving the encoded data from the controller, for converting the received data into a record pulse current, and for supplying the converted current to a coil in the servo signal write head.

According to the third aspect, the controller encodes the output level data. Following this, a pulse generation circuit converts the encoded data into a record pulse current, and supplies the converted current to a coil in the servo signal write head. Finally, a servo signal write head writes the servo signal on the servo band of the magnetic tape. In this way, the servo signal can contain the output level data.

It is a fourth aspect of the present invention to provide a magnetic tape drive including:
(a) a servo signal read head for reading the servo signal having been written on the magnetic tape in the magnetic tape; and
(b) a fine-adjusting means for fine-adjusting an output level of the servo signal to a predetermined level,
the magnetic tape drive further including:
(c) a servo signal decoder for decoding the servo signal having been read by the servo signal read head, and for extracting the output level data from the decoded servo signal; and
(d) a correcting means for correcting the output level of the servo signal, based on the output level data, and for outputting the servo signal to the fine-adjusting means.

Herein, the magnetic tape drive naturally includes an appliance that records/reproduces data on/from a magnetic tape cartridge and, further includes appliances that exclusively records data on a magnetic tape cartridge and exclusively reproduces date therefrom.

According to the fourth aspect, once the magnetic tape cartridge is set in the magnetic tape drive, this magnetic tape drive uses its servo signal read head to read the servo signal, and outputs the servo signal to the servo signal decoder. Following this, the servo signal decoder decodes the servo signal having been read by the servo signal read head, extracts the output level data from the decoded servo signal, and outputs the data to the correcting means. Subsequently, a correcting means corrects the output level of the servo signal, based on the output level data, and outputs the servo signal to the fine-adjusting means. Finally, the fine-adjusting means fine-adjusts the output level of the servo signal to a predetermined level. Consequently, this magnetic drive can recognize the output level of the servo signal in the magnetic tape cartridge, and adjust it to an allowable level, regardless of the type of the magnetic tape cartridge.

It is a fifth aspect of the present invention to provide a magnetic tape drive including:
(a) a memory information reading means for reading the output level data having been written on the cartridge memory in the magnetic tape cartridge;
(b) a fine-adjusting means for fine-adjusting an output level of the servo signal to a predetermined level; and
(c) a correcting means for correcting the output level of the servo signal, based on the output level data, and for outputting the servo signal to the fine-adjusting means.

According to the fifth aspect, once the magnetic tape cartridge is set in the magnetic tape drive, this magnetic tape drive uses its memory information reading means to read the output level data from the cartridge memory (non-contact memory), and outputs the data to the correcting means. Following this, a correcting means corrects the output level of the servo signal, based on the output level data, and outputs the servo signal to the fine-adjusting means. Finally, the fine-adjusting means fine-adjusts the output level of the servo signal to a pre-determined level. Consequently, this magnetic drive can recognize the output level of the servo signal in the magnetic tape cartridge, and adjust it to an allowable level, regardless of the type of the magnetic tape cartridge.

It is a sixth aspect of the present invention to provide a method for reading a servo signal, including:
(a) a servo signal reading process for reading the servo signal having been written on the magnetic tape in the magnetic tape cartridge;
(b) a fine-adjusting process for fine-adjusting, to a predetermined level, the output level of the servo signal having been read in the servo signal reading process;
(c) a servo signal decoding process for decoding the servo signal having been read in the servo signal reading process, and for extracting the output level data from the servo signal; and
(d) a correcting process for correcting the output level of the servo signal, based on the output level data having been extracted in the servo signal decoding process.

In this case, the servo signal decoding process and the correcting process are performed after the servo signal reading process and before the fine-adjusting process.

According to the sixth aspect, the servo signal that has been written on the magnetic tape in the magnetic tape cartridge is read in the servo signal reading process. Following this, the servo signal is decoded in the servo signal decoding process, and the output level data is extracted from the servo signal. Subsequently, the output level of the servo signal is corrected based on the output level data in the correcting process. Finally, the output level that has been corrected is fine-adjusted to a predetermined level in the fine adjusting process. Consequently, with the method, the magnetic drive can recognize the output level of the servo signal in the magnetic tape cartridge, and adjust it to an allowable level, regardless of the type of the magnetic tape cartridge.

It is a seventh aspect of the present invention to provide a method for reading a servo signal, including:
(a) a servo signal reading process for reading the servo signal having been written on the magnetic tape in the magnetic tape cartridge;
(b) a fine-adjusting process for fine-adjusting, to a predetermined level, the output level of the servo signal having been read in the servo signal reading process;
(c) a output level data reading process for reading the output level data from the cartridge memory; and
(d) a correcting process for correcting the output level of the servo signal, based on the output level data having been read the output level data reading process.

In this case, the output level data reading process and the correcting process are performed before the fine-adjusting process.

According to the seventh aspect, the servo signal that has been written on the magnetic tape in the magnetic tape cartridge is read in the servo signal reading process. Following this, the output level data is read from the cartridge memory in the output level data reading process. Subsequently, the output level of the servo signal is corrected based on the output level data in the correcting process. Finally, the output level that has been corrected in the correcting process is fine-adjusted to an allowable level.

With the above method for reading a servo signal, the magnetic tape drive can recognize the output level of the magnetic tape cartridge and adjust the level to an allowable level. Consequently, the magnetic tape drive can records/reproduces data on/from the magnetic tape cartridge, regardless of the type of the magnetic tape cartridge. Note that the servo signal reading process may be performed substantially simultaneously with the output level data reading process, or after the output level data reading process.

BRIEF DESCRIPTION OF THE DRAWINGS

For a more complete understanding of the present invention and the advantages hereof, reference is now made to the following description taken in conjunction with the accompanying drawings wherein.

DETAILED DESCRIPTION OF THE EXEMPLARY EMBODIMENTS OF THE INVENTION

[First Embodiment]

Description will be given in detail below of a magnetic tape cartridge, a servo writer, a magnetic tape drive, and a method for reading a servo signal, which are all according to a first embodiment of the present invention, with reference to accompanying figures as appropriate.

Figure 1A:
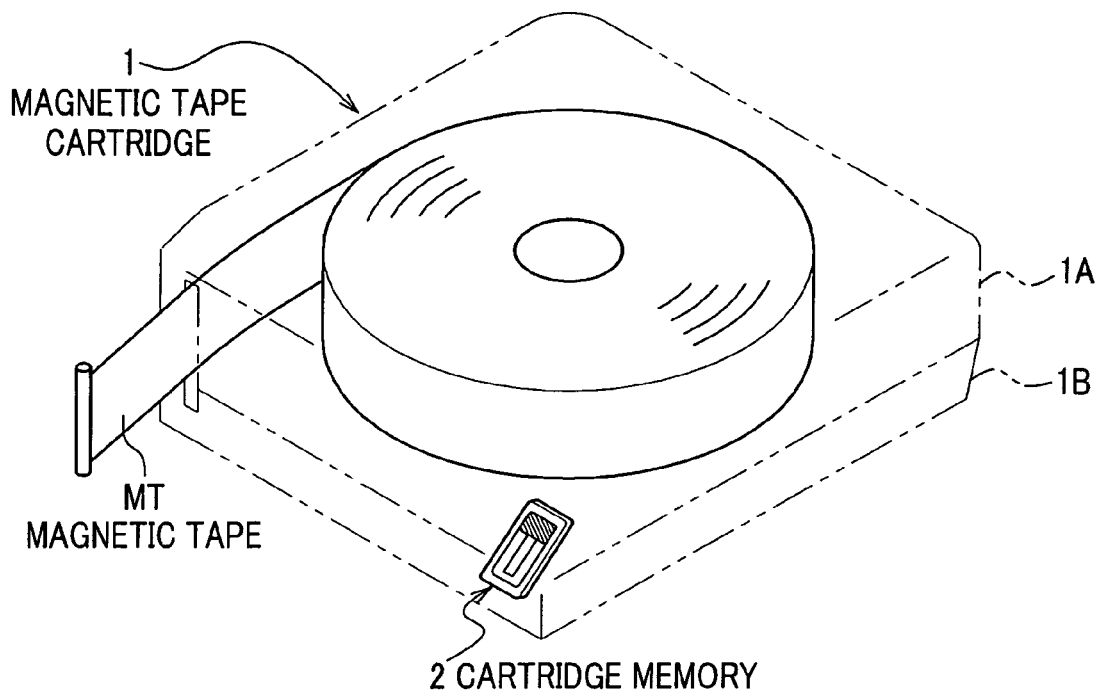
FIG. 1A is a perspective view depicting a magnetic tape cartridge according to a first embodiment of the present invention.
Figure 1B:
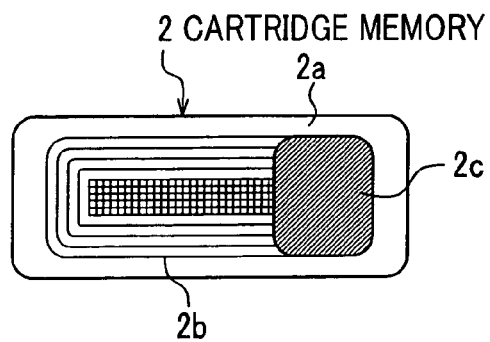
FIG. 1B is a plane view depicting a cartridge memory provided on the magnetic tape cartridge.

As FIGS. 1A and 1B, a magnetic tape cartridge 1 includes, as main components, upper and lower cases 1A and 1B split apart from each other, a magnetic tape MT on which data is to be recorded and which is placed inside the upper and lower cases 1A and 1B, and a cartridge memory 2 which communicates information in a non-contact manner. The cartridge memory 2 is a rectangular, thin electric component, and includes an IC chip (not shown) within as a main element, a glob top 2c that is formed of a resin as a sealant and that seals the IC chip, a substrate 2a, and a loop antenna 2b that is printed on the substrate 2a and that is connected to the loop antenna 2b.

Figure 2:
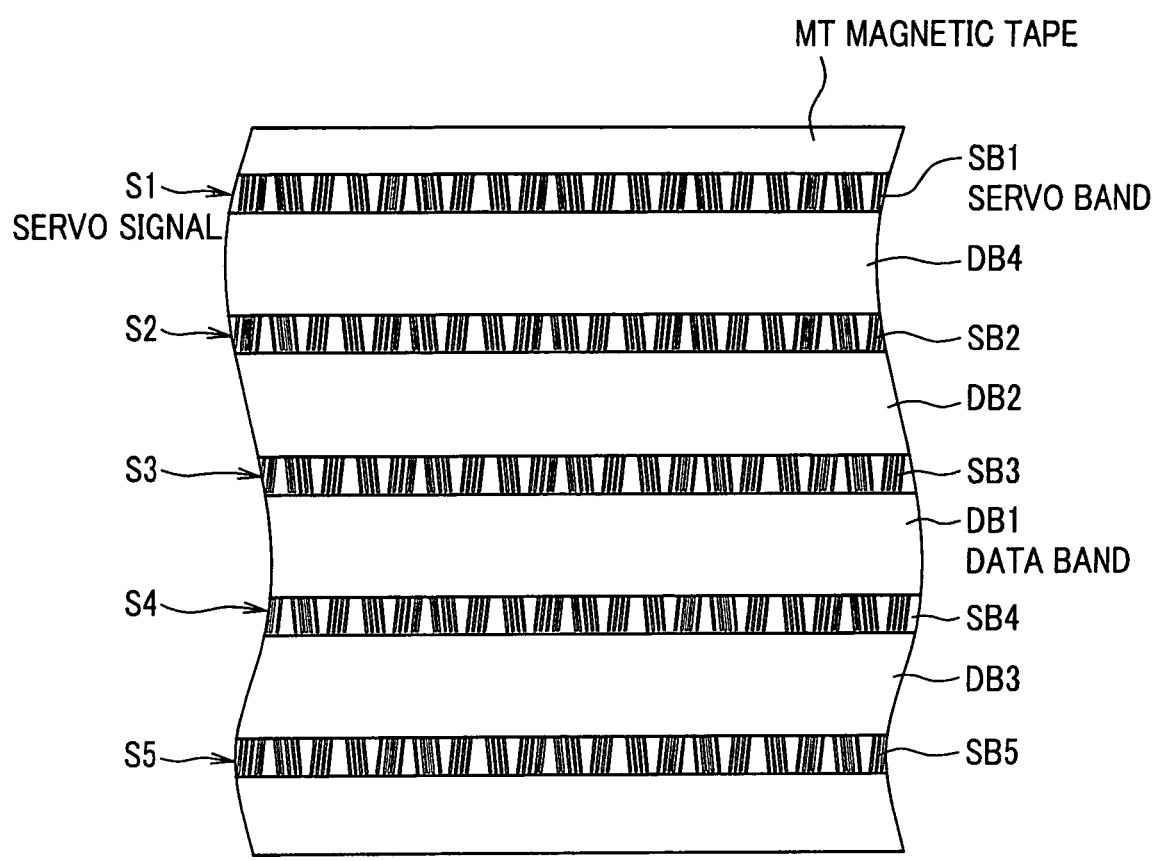
FIG. 2 is a plane view depicting a magnetic tape according to a first embodiment.
Figure 3:
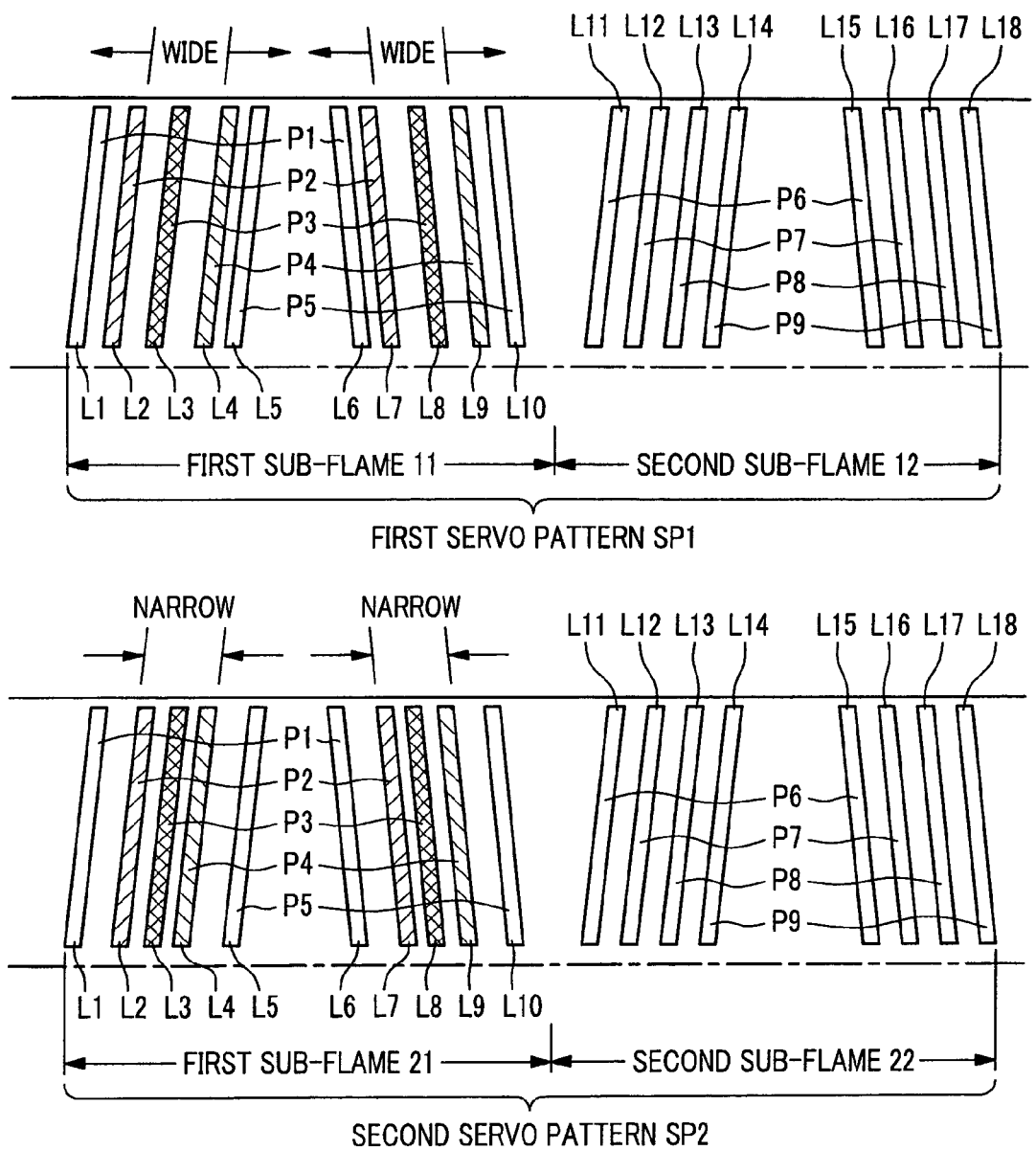
FIG. 3 is an enlarged view depicting a servo signal on the magnetic tape.

With reference to FIGS. 2 and 3, a description will be given below of servo signals S1 to S5 written on the magnetic tape MT. As shown in FIG. 2, the five servo bands SB1 to SB5 are spanned lengthwise on the magnetic tape MT, and are arranged breadthwise at predetermined intervals. Data bands DB1 to DB4 are arranged between servo bands SB3 and SB4, between SB2 and SB3, between SB4 and SB5 and between SB1 and SB2, respectively. The servo bands SB1 to SB5 contain the servo signals S1 to S5, respectively, for controlling tracking of a magnetic head on the magnetic tape MT.

In this embodiment, the servo bands SB1 to SB5 are DC-magnetized in one direction (forward direction) along the long side of the magnetic tape MT, and the parts of the magnetized servo bands SB1 to SB5 are magnetized in the opposite direction, thus forming servo signals S1 to S5. Thereinafter, a magnetic tape cartridge which includes within a magnetic tape thicker than the magnetic tape MT of this embodiment is defined as a conventional magnetic tape cartridge. Further, an output level of each servo signal in a conventional magnetic tape cartridge is assumed to be 100%, while that of each of the DC magnetized servo bands SB1 to SB5 in the magnetic tape cartridge of this embodiment is assumed to be 70%. Note that both the output levels are obtained on the condition that each servo signal is normally read.

Each of the servo signals S1 to S5 includes first and second servo patterns SP1 and SP2 arbitrarily arranged lengthwise, as shown in FIG. 3. The first servo pattern SP1 is composed of first and second sub-flames 11 and 12 which are not parallel to each other, and the second servo pattern SP2 is composed of first and second sub-flames 21 and 22 which are not parallel to each other, either.

The first sub-flames 11 and 21 are each constituted of five linear patterns L1 to L5 inclined relative to the long side of the magnetic tape MT, and five linear patterns L6 to L10 that are symmetric to the linear patterns L1 to L5, respectively. The linear patterns L1 to L5 and L6 to L10 are not parallel to one another. These linear patterns L1 to L10 are formed by a servo signal write head WH that is provided with the gap patterns G having a shape shown in FIG. 7. Therefore, the respective intervals between the linear patterns L1 and L6, between L2 and L7, between L3 and L8, between L4 and L9, and between L5 and L10 are the same as the widths of gap patterns G, respectively. Thereinafter, linear pattern pairs L1 and L6 to L5 and L10 are denoted by first, second, third, fourth and fifth linear pattern pairs P1, P2, P3, P4 and P5, respectively, for convenience.

In the first sub-flame 11 of the first servo pattern SP1, the second and fourth linear pattern pairs P2 and P4 are located away from the third linear pattern pair P3. Meanwhile, in the first sub-flame 21 of the second servo pattern SP2, the second and fourth linear pattern pairs P2 and P4 are located close to the third linear pattern pair P3. Each of the second sub-flames 12 and 22 is composed of the linear patterns L11 to L14 and L15 to L18. The linear patterns L11 to L14 are inclined with respect to the long side of the tape, and the linear patterns L15 to L18 are symmetrical to the linear patterns L11 to L14. The linear patterns L11 to L18 which constitute the linear pattern pairs P6 to P9 are arranged lengthwise at regular intervals. Note that each linear pattern pairs described-above may be any type of patterns, as long as the patterns are not parallel to each other.

As described above, the first sub-flame 11 in the first servo pattern SP1 has the pattern formation different from that of the first sub-flames 21 in the second servo pattern SP2. Owing to these formations, the first servo pattern SP1 indicates data of "1", while the second servo pattern SP2 indicates data of "0". The first and second servo patterns SP1 and SP2 are arbitrarily arranged lengthwise, and certain data can thereby be detected when the servo signal S1 is read.

Next, a data structure configured by the servo signal S1 will be explained below with reference to FIG. 4, by taking a data structure of ECMA 319 as an example. Note that, since the servo signals S2 to S5 have a data structure similar to that of the servo signal S1, the explanation therefore will be omitted.

Figure 4:
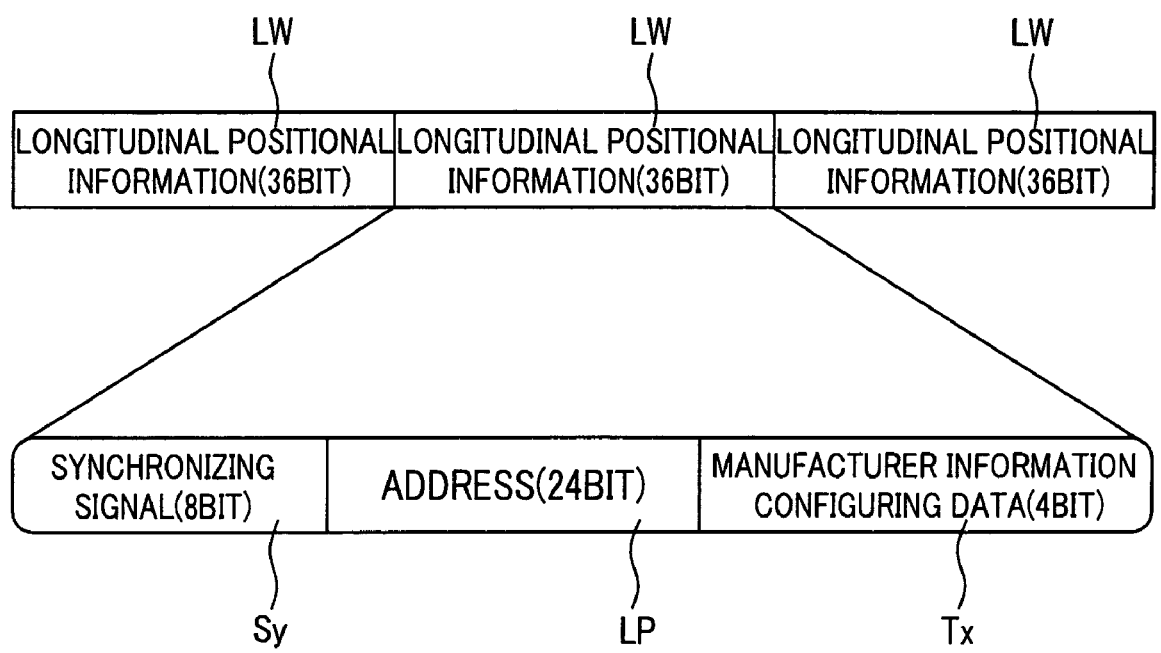
FIG. 4 is a view depicting a data structure contained in the servo signal.

As shown in FIG. 4, the data contained in the servo signal S1 is configured by thirty-six patterns SP1 and SP2, that is, by 36 bits of data indicating longitudinal positional information LW (LPOS word). Each piece of longitudinal positional information LW contains 8 bits of start synchronizing signal Sy (sync mark), 24 bits of address data LP (longitudinal position) and 4 bits of manufacturer information configuring data Tx (Manufacturer data).

Figure 5:
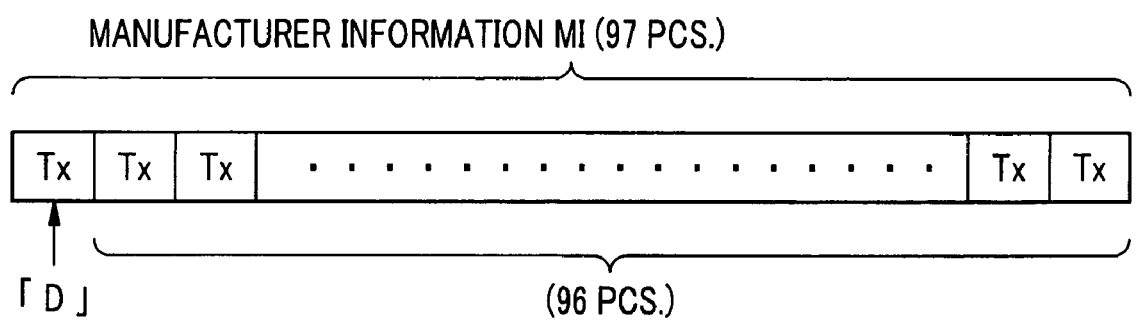
FIG. 5 is a view depicting manufacturer information that is configured by manufacture information configuring data of FIG. 4.

The manufacturer information configuring data Tx is recognized as manufacturer information MI at the moment when 97 pieces of longitudinal positional information LW are read, as shown in FIG. 5. In the manufacturer information MI, a first piece of data Tx, which indicates a starting point, contains data of, for example, "D" that is converted from 4 bits of data such as "0001" by use of a predetermined table. Then, 96 pieces of manufacturer information configuring data Tx are any data other than "D", such as 0, 1, . . . . 9, A, B and C. The 96 pieces of manufacturer information configuring data Tx indicates a manufacturer ID, a manufacturing date of a tape, serial number of a tape, a servo writer ID, an operator ID and an output level (70%) of a servo signal S1.

Note that 4 pieces of the manufacturer information configuring data Tx are allocated to output level data in this embodiment, but this number is not limited in the present invention, and may be any number. For example, if the output level data is used to indicate information on whether the servo bands SB1 to SB5 are DC-magnetized (DC-erased), then this data suffices for one bit of data. In this case, only one piece of manufacturer information configuring data Tx may be allocated to it.

Figure 6:
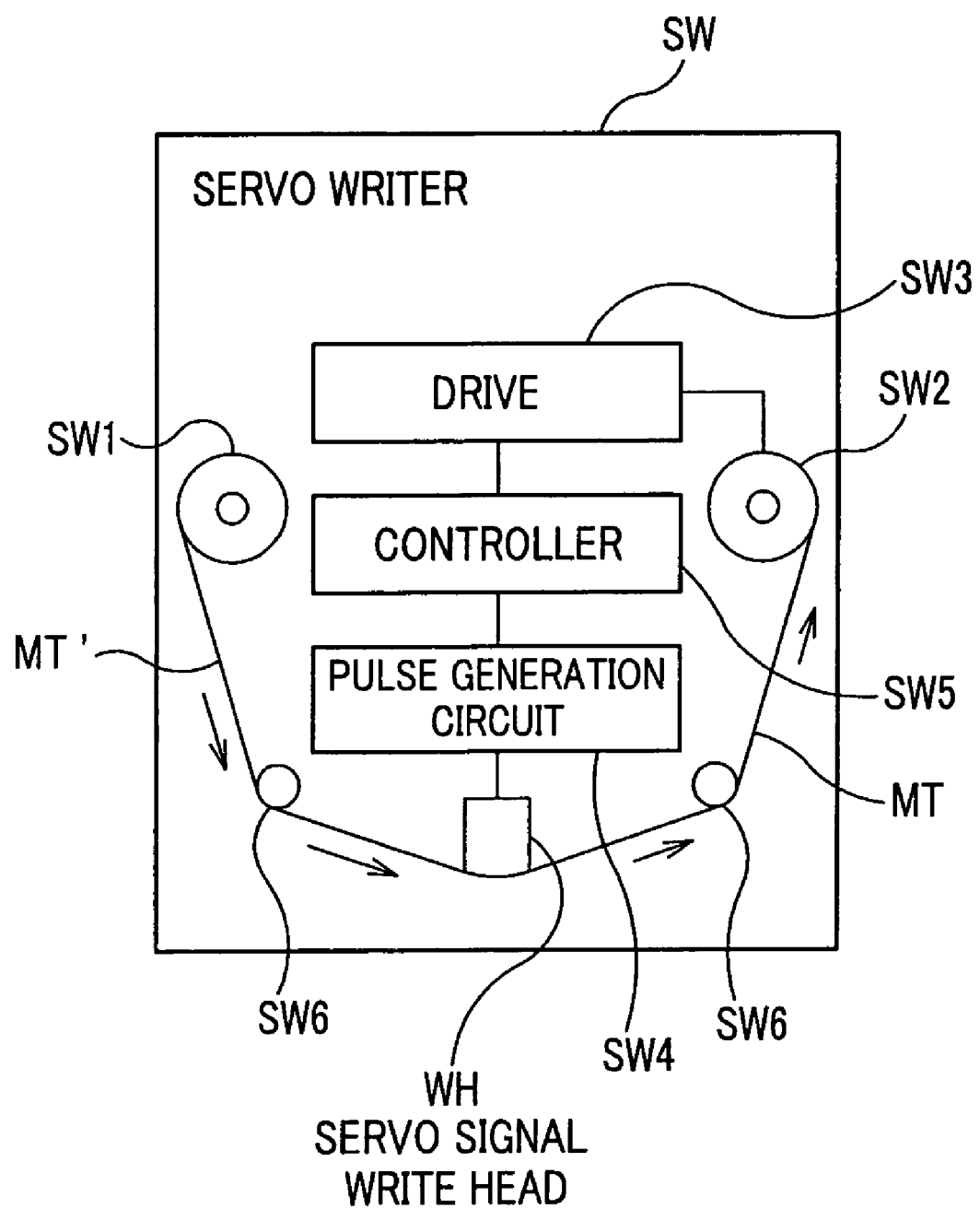
FIG. 6 is a block diagram illustrating a servo writer according to the first embodiment.

Next, a description will be given below of a mode in which a servo writer SW writes the servo signals S1 to S5 on the magnetic tape MT, with reference to FIGS. 6 and 7. As shown in FIG. 6, the servo writer SW includes, as main components, a supply reel SW1, a take-up reel SW2, a drive SW3, pulse generation circuits SW4, a servo signal write head WH, and a controller SW5. Further, the servo writer SW includes a power supply, a cleaning device that cleans the magnetic tape MT, and a verifying device that verifies the written servo signals S1 to S5, which are not all shown in the figure.

In the supply reel SW1, a magnetic tape MT', which has been formed by cutting a wide web material to a product width and which does not contain the servo signals S1 to S5 yet, is wound around a pancake coil of a large diameter, and is fed upon writing of the servo signals S1 to S5. The magnetic tape MT' fed from the supply reel SW1 is guided by a guide SW6, etc. and is transported to the servo signal write head WH. The servo signals S1 to S5 are then written on the magnetic tape MT' by the servo signal write head WH. Subsequently, the magnetic tape MT is guided by a guide SW6, etc., and is transported to the take-up reel SW2. In this case, the take-up reel SW2 is rotatably driven by the drive SW3, and winds the magnetic tape MT.

The drive SW3 rotatably drives the take-up reel SW2, and includes a motor, and a motor driving circuit that supplies a current to the motor, and a gear that couples a shaft of the motor with the take-up reel SW2, which are not all shown in the figure. The drive SW3 uses the motor driving circuit to generate a motor current in response to a current signal from the controller SW5, then supplies the motor current to the motor, and transmits the rotating power of the motor to the take-up reel SW2 through the gear, thereby rotatably driving the take-up reel SW2.

The supply reel SW1, the take-up reel SW2, the drive SW3 and the guide SW6 all constitutes a magnetic tape running system herein.

The pulse generation circuits SW4 supply record pulse currents to coils C (see FIG. 7) in response to the pulse control signals from the controller SW5, respectively, and correspond to the respective coils C independently of one another. Specifically, each pulse generation circuit SW4 alternatively generates a plus or minus pulse current and a zero current in response to the pulse control signal from the controller SW5, thereby writing the first and second servo patterns SP1 and SP2 on desired locations of the servo band of the magnetic tape MT'. The record pulse current is so large that leakage flux in each gap pattern G (see FIG. 7) is generated to magnetize a magnetic layer of the magnetic tape MT', and this current value is determined in consideration of the property of the coils C of the servo signal write head WH.

Figure 7:
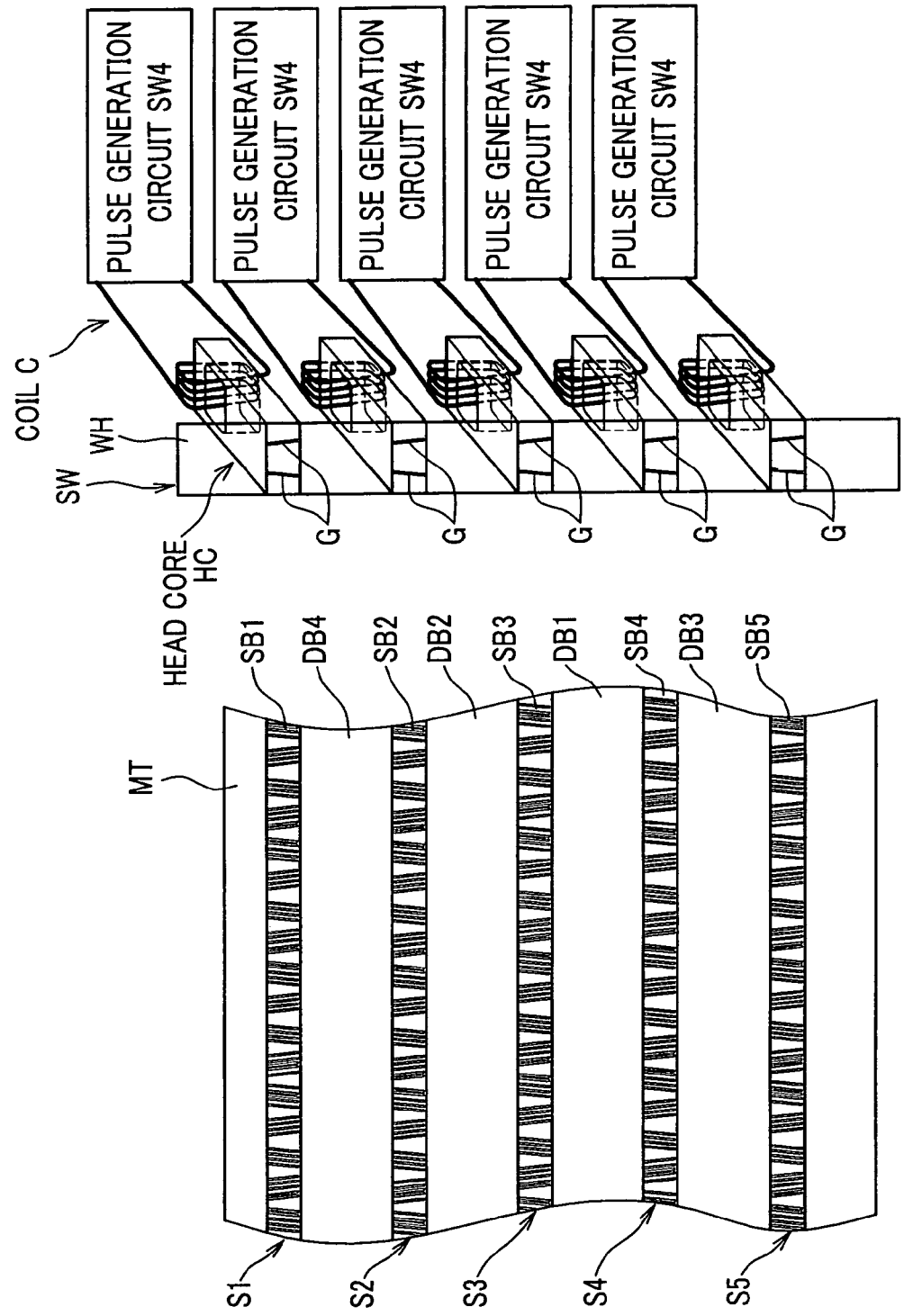
FIG. 7 is a plane view depicting servo signal write heads of the servo writer.

As shown in FIG. 7, the servo signal write head WH has the gap patterns G, G . . . and G which are positioned corresponding to the servo bands SB1 to SB5, and these gap patterns G, G . . . and G record the servo signals S1 to S5 on the servo bands SB1 to SB5, respectively.

The head cores HC are provided corresponding to the gap patterns G independently of one another, and have the respective coils C wound therearound. The pulse generation circuits SW4 are connected to the respective coils C, and converts, into record current patterns, pieces of output level data that indicate the output levels (70%) of the servo signals S1 to S5 encoded by the controller SW5 (see FIG. 6). The pulse generation circuits SW4 further supplies these record current patterns to the respective coils C. Note that, as this data encode technique, one described in Japanese Unexamined Patent Application Publication No. 10-334435 is cited. With this technique, the pieces of output level data that indicate the output levels (70%) of the servo signals S1 to S5 are written on the servo signals S1 to S5, respectively.

Next, a description will be given below of a method by which the servo writer SW writes the servo signals S1 to S5 on the magnetic tape MT', with reference to FIGS. 6 and 7 again. As shown in FIG. 6, the magnetic tape running system runs the magnetic tape MT', and the pulse generation circuits SW4 shown in FIG. 7 supply the record current patterns to the coils C wound around the head cores HC of the servo signal write head WH, respectively. Every time the record current patterns are supplied to the head cores HC, the gap patterns G write the servo signals S1 to S5 on the servo bands SB1 to SB5, respectively. In this case, the written servo signals S to S5 contain the pieces of output level data that indicate the output levels (70%) of the servo signals S1 to S5, respectively.

Figure 8:
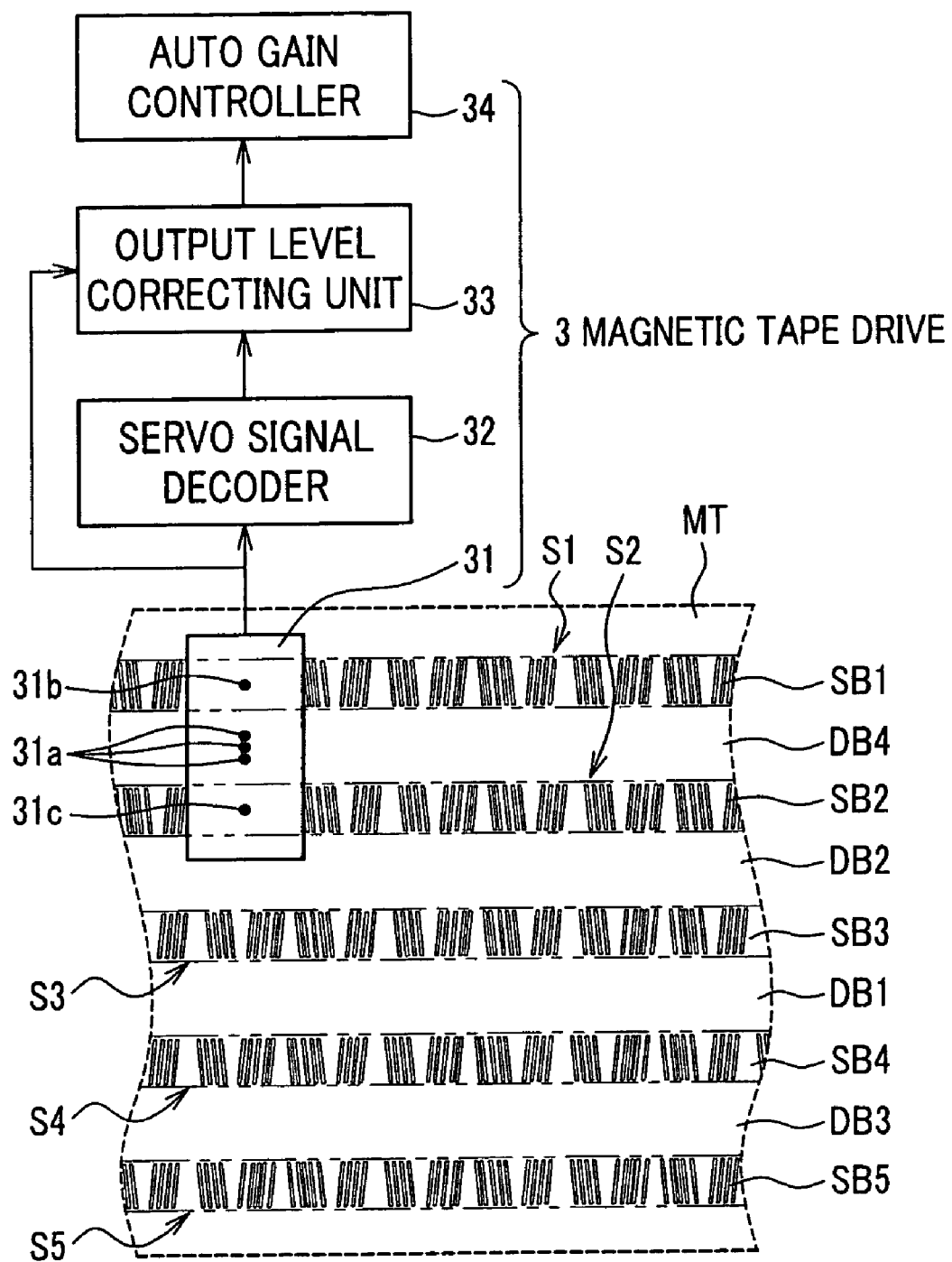
FIG. 8 is a block diagram illustrating a magnetic tape drive according to the first embodiment.

This time, a description will be given below of a magnetic tape drive according to the present invention, with reference to FIG. 8. As shown in FIG. 8, the magnetic tape drive 3 includes, as main components, a head unit 31, a servo signal decoder 32, an output level correcting unit 33 as a correcting mean, and an auto gain controller 34 as a fine control means. The head unit 31 includes, as main components, multiple heads 31a that record/reproduce data on/from the data bands DB1 to DB4, a servo read head 31b that reads the servo signals S1 to S5 having been written on the servo bands SB1 to SB5, respectively, and a spare servo read head 31c.

The servo read head 31b mainly read pulse signals, that is, the servo signals S1 to S5 from the servo bands SB1 to SB5, respectively. The spare servo read head 31c is used when the servo read head 31b is broken down or temporarily fails due to clogging, etc, and has a function of reading the servo signals S1 to S5 as with the servo read head 31b.

The servo signal decoder 32 decodes the output level data which is encoded for indicating the output level of the servo signal, and which is contained in the servo signal, such as the servo signal S1, read by the servo read head 31b or the spare servo read head 31c. The output level correcting unit 33 determines a constant (100/70), based on the output level data (70%) outputted from the servo signal decoder 32, then corrects the output level (70%) of the servo signal S1 by multiplying the output level by the constant, and outputs the corrected signal to the auto gain controller 34. Note that the calculation of the constant is carried out by use of an output level (100%) of a conventional magnetic tape as a reference.

In this embodiment, the constant is determined by the output level correcting unit 33, but the present invention is not limited to this, and the constant may be contained in the servo signal S1 beforehand, as output level data. In this case, the output level correcting unit 33 does not determine the constant, and merely amplifies the output level (70%) of the servo signal S1, based on the output level data being read.

When the magnetic tape drive 3 records/reproduces data on/from a conventional magnetic tape in which servo signals do not contain the output level data, the servo signal decoder 32 and the output level correcting unit 33 do not perform the above operations, and merely pass, as it is, the servo signal being read by the servo read head 31$b$, etc. to the auto gain controller 34. In other words, the output level of the servo signal of a conventional magnetic tape is regarded as 100% and the servo signal is then directly outputted to the auto gain controller 34.

The auto gain controller 34 receives the servo signal S1, and fine-adjusts its level to a predetermined level. This auto gain controller 34 has an adjustable range of ±50%, and therefore, if the output level of the received servo signal S1 falls within a range from 50% to 150%, then the auto gain controller 34 can adjust the level of the signal to 100%. Note that the predetermined level is equal to this output level (100%) of the servo signal of the conventional tape.

A description will be given below of a method by which the magnetic tape drive 3 reads a servo signal S1. As shown in FIG. 8, the servo read head 31$b$ is positioned over the servo band SB1, and reads the servo signal S1 from the servo band SB1 (servo signal reading process). The servo read head 31$b$ outputs the servo signal S1 having been read to the servo signal decoder 32. Subsequently, the servo signal decoder 32 decodes the received servo signal S, and acquires the output level data from the servo signal S1 (the servo signal decoding process). In this servo signal decoding process, the servo signal decoder 32 first extracts, from the ninety-six pieces of manufacturer information configuring data, only a portion (for example, four pieces of Tx) allocated to the output level data indicating the output level (70%) of the servo signal S1. The servo signal decoder 32 then decodes the extracted portion.

The servo signal decoder 32 outputs the decoded output level data (70%) to the output level correcting unit 33. Subsequently, the output level correcting unit 33 determines a constant in accordance with the output level data (70%), and amplifies the output level of the servo signal S1 to 100%, based on the constant (correcting process). The output level correcting unit 33 then outputs the corrected servo signal S1 to the auto gain controller 34. The auto gain controller 34 fine-adjusts the level of the received servo signal S1 to 100% (fine adjusting process). Finally, the controller (not shown) appropriately controls a record/reproduction head (not shown), based on the fine-adjusted signal, so that data is appropriately recorded/reproduced on/from the magnetic tape. Note that, as already described, when it receives the servo signal S1 of which output level is 100%, the auto gain controller 34 does not fine-adjust the signal, and maintains it as it is.

The above description has been given, provided that the servo signal S1 is normally read, but if the output level of the servo signal S1, which is read by the servo read head 31$b$, is decreased to 40%, then this output level is amplified to about 57%, based on the constant (100/70). In other words, without the output level correcting unit 33, etc, the magnetic tape drive cannot read the servo signal S1, if the output level (70%) is decreased to 40%. This is because the output level falls outside the adjustable range (50 to 150%). In contrast, the magnetic tape drive according to this embodiment can read the servo signal S1 even if the output level is decreased to 40%, because the output level correcting unit 33, etc. amplify the output level to about 57%, i.e., to a value within an adjustable range of the auto gain controller 34.

In conclusion, following effects can be produced in the first embodiment. With the output level data contained in the servo signal S1, the magnetic tape drive 3 can recognize the output level of the servo signal S1 upon reading of the servo signal S1. Accordingly, even when it reads different types of magnetic tape cartridges, the magnetic tape drive 3 can recognize the respective output levels of these magnetic tape cartridges, and adjust these output levels to an appropriate level.

Since the magnetic tape drive 3 has the spare servo read head 31$c$, the operations in this embodiment can be performed, even if the servo read head 31$b$ fails. Furthermore, the pieces of output level data are contained in the respective pieces of longitudinal positional information LW (manufacturer information configuring data Tx), which are recorded repeatedly along the long side of the magnetic tape MT. Therefore, the magnetic tape drive 3 can select desired one from the pieces of longitudinal positional information LW to thereby read it, so that the output level data can be recognized from the longitudinal positional information LW. Moreover, even if some of the pieces of the output level data is lacked, the magnetic tape drive 3 can select the normal pieces of output level data from the pieces of longitudinal positional information LW to thereby read them.

Figure 9:
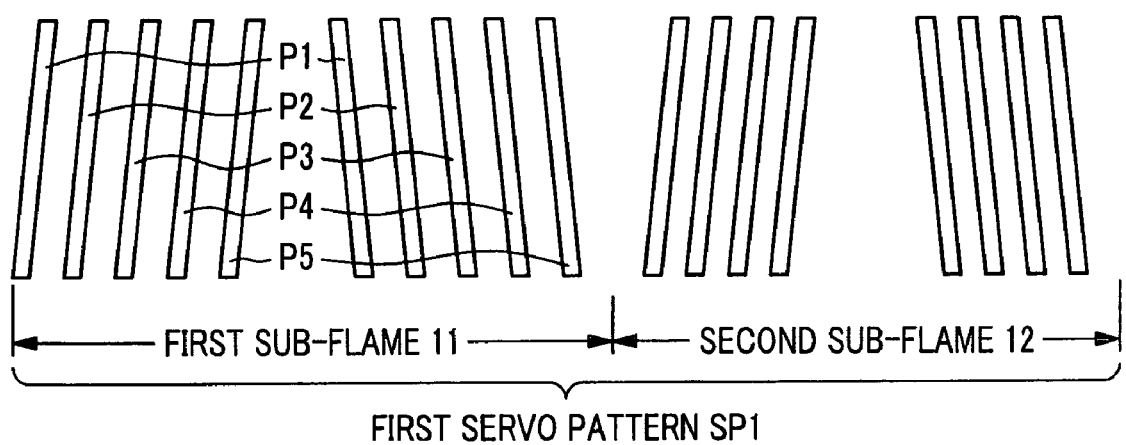
FIG. 9 is an enlarged view depicting a variation of the servo signal according to the first embodiment.
Figure 9:
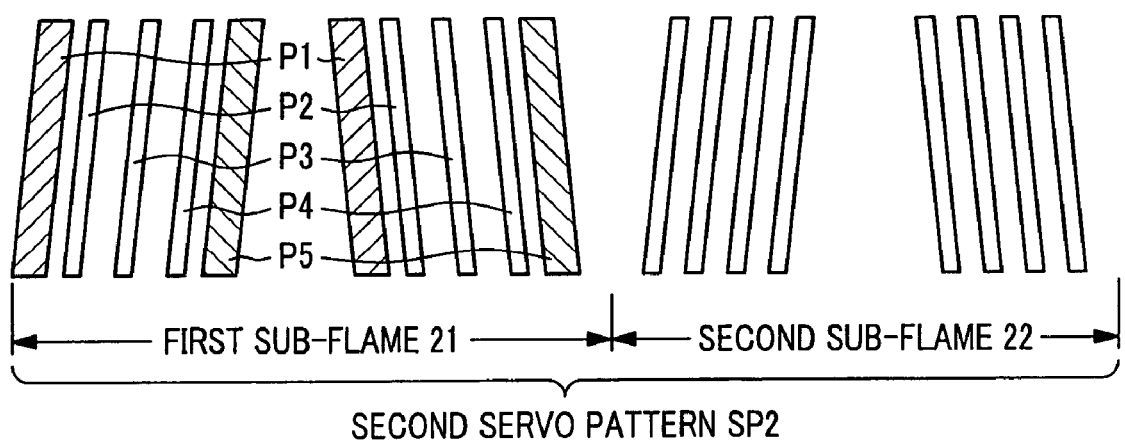

As described above, the first embodiment has been described, but the present invention is not limited to this first embodiment, and can be implemented with various embodiments. In the first embodiment, the respective intervals of five pattern pairs P1 to P5 are varied, thereby forming two types of servo patterns, that is, the servo patterns SP1 and SP2, but the present invention is not limited to this. For example, as shown in FIG. 9, the respective intervals of the five pattern pairs in the first sub-flame 11 of the first servo pattern SP1 may be made regular, whereas the widths of the first and fifth linear pattern pairs P1 and P5 in the first sub-flame 21 of the second servo pattern SP2 may be made wider. In this way, the two types of servo patterns SP1 and SP2 are formed, so that the servo signals S1 to S5 can contain the output level data as with this embodiment.

In this case, in order to vary the widths of the patterns, the time required to supply a record current is merely shortened or lengthened. In addition, the widths can be arbitrarily varied and, for example, the widths of the first and fifth linear pattern pairs P1 and P5 are set to be narrower than other pairs.

In the first embodiment, the two servo read heads 31$b$ and 31$c$ are provided, but the present invention is limited to this. The number of the servo read heads may be one or any number. The respective number of the servo signal decoders 32, the output level correcting units 33 and the auto gain controllers 34 may also be one. In addition, this number may be the same as that of the servo read heads. Similarly, the data structures in FIGS. 4 and 5 are merely examples, and the present invention is not limited to these examples. For instance, the servo signal may not contain LPOS, the manufacturer information and the like, and may contain only the output level data.

[Second Embodiment]

A description will be given below of a magnetic tape cartridge and a magnetic tape drive according to a second embodiment of the present invention. Contents in this second embodiment differs from those in the first embodiment in that the cartridge memory 2, which is included in the magnetic tape cartridge 1 according to the first embodiment, contains the output level data. The same reference numerals are given to the same parts as those already described in the first embodiment, and duplicate description therefore is omitted. In this embodiment, as with the first embodiment, the servo bands SB1 to SB5 are DC-magnetized in one (forward) direction along the long side of the magnetic tape MT, and the servo signals S1 to S5 are magnetized on the servo bands SB1 to SB5, respectively, in the opposite direction.

Figure 10:
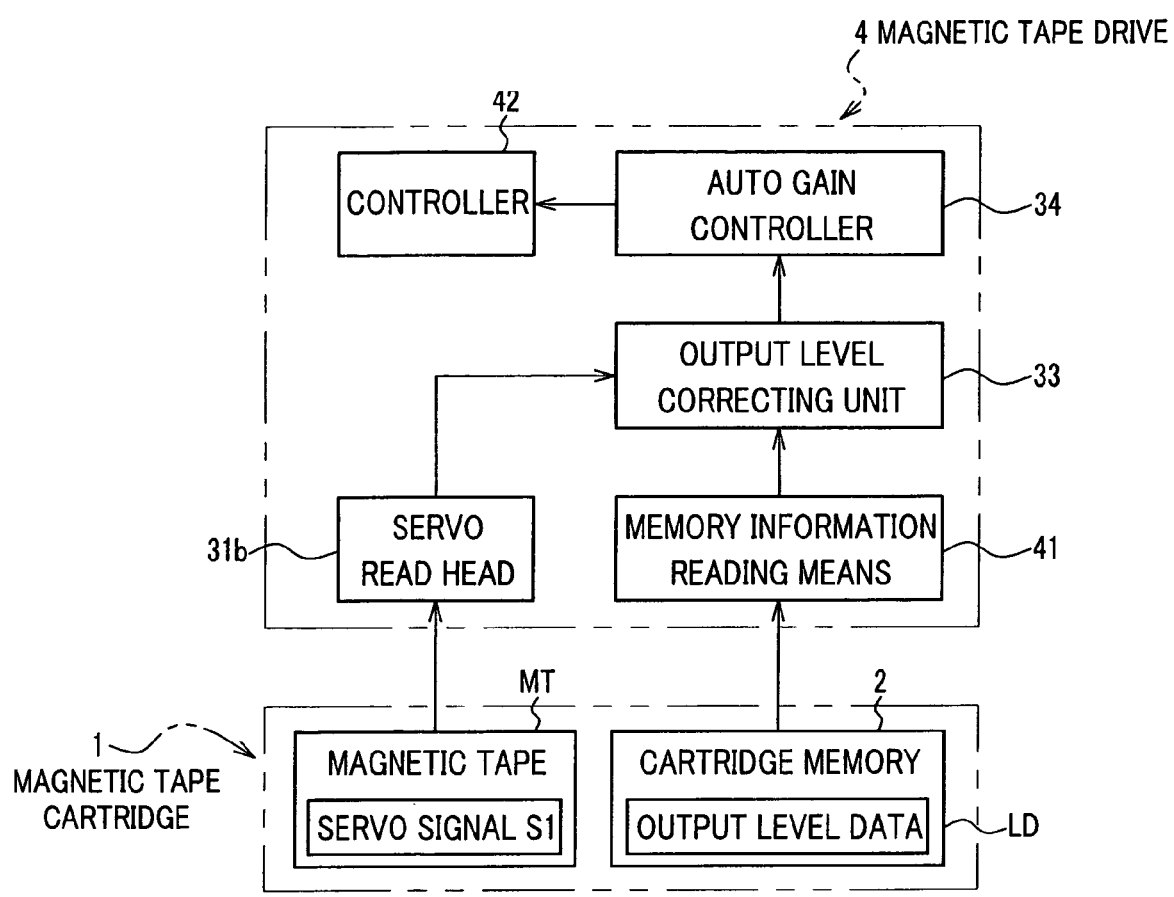
FIG. 10 is a block diagram illustrating a magnetic tape drive according to a second embodiment.
Figure 11A:
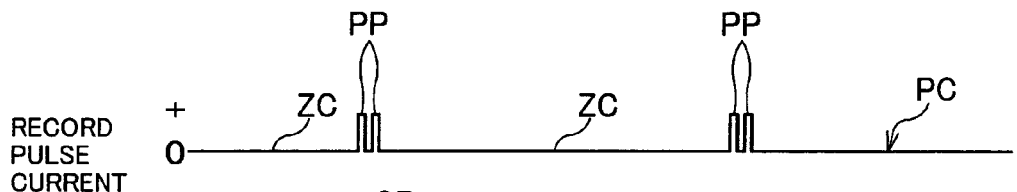
FIG. 11A is a view depicting a record pulse current for writing servo signals on a conventional servo tape.
Figure 11B:
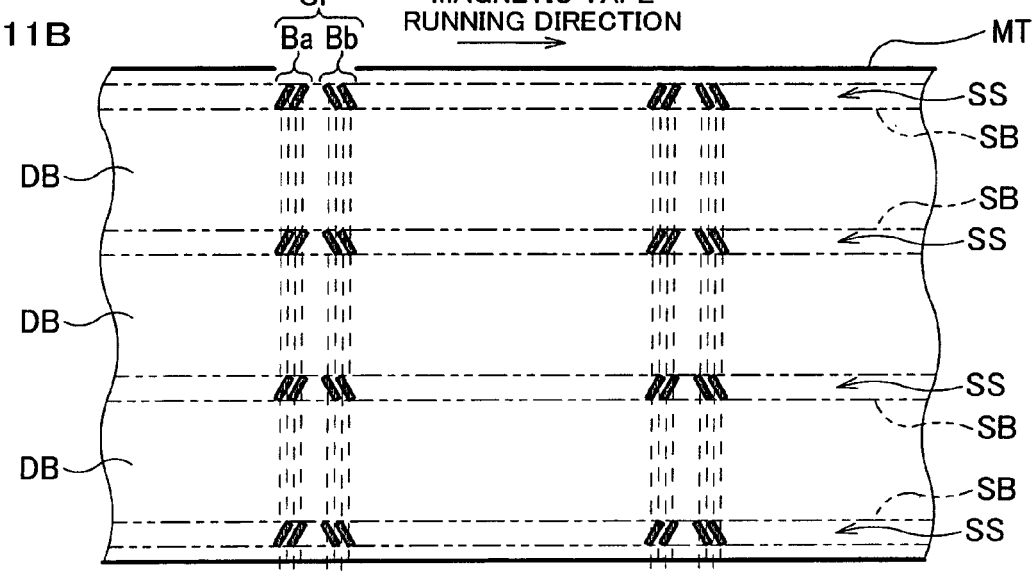
FIG. 11B is a plane view depicting the conventional magnetic tape.
Figure 11C:
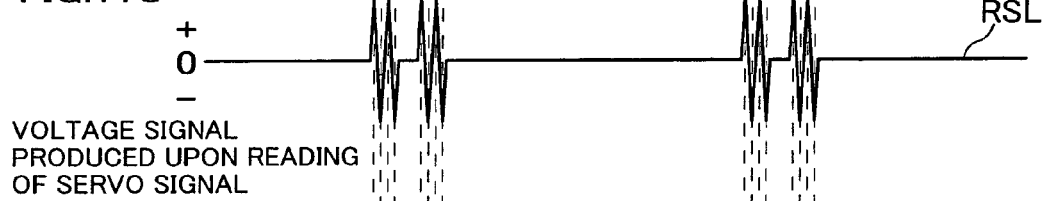
FIG. 11C is a plane view depicting a voltage signal being read from the servo signal when a record device has a large sensing area.
Figure 11D:
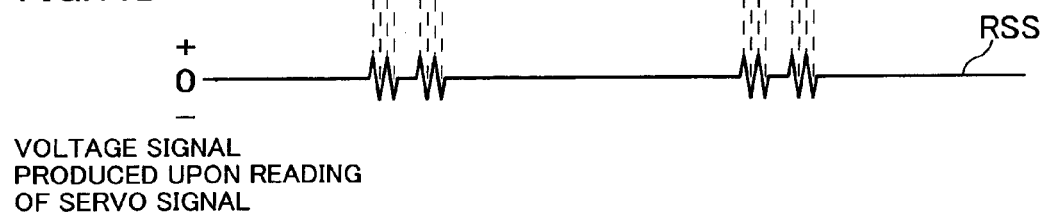
FIG. 11D is a plane view depicting the voltage signal being read from the servo signal when the magnetic tape is thinned.
Figure 12A:
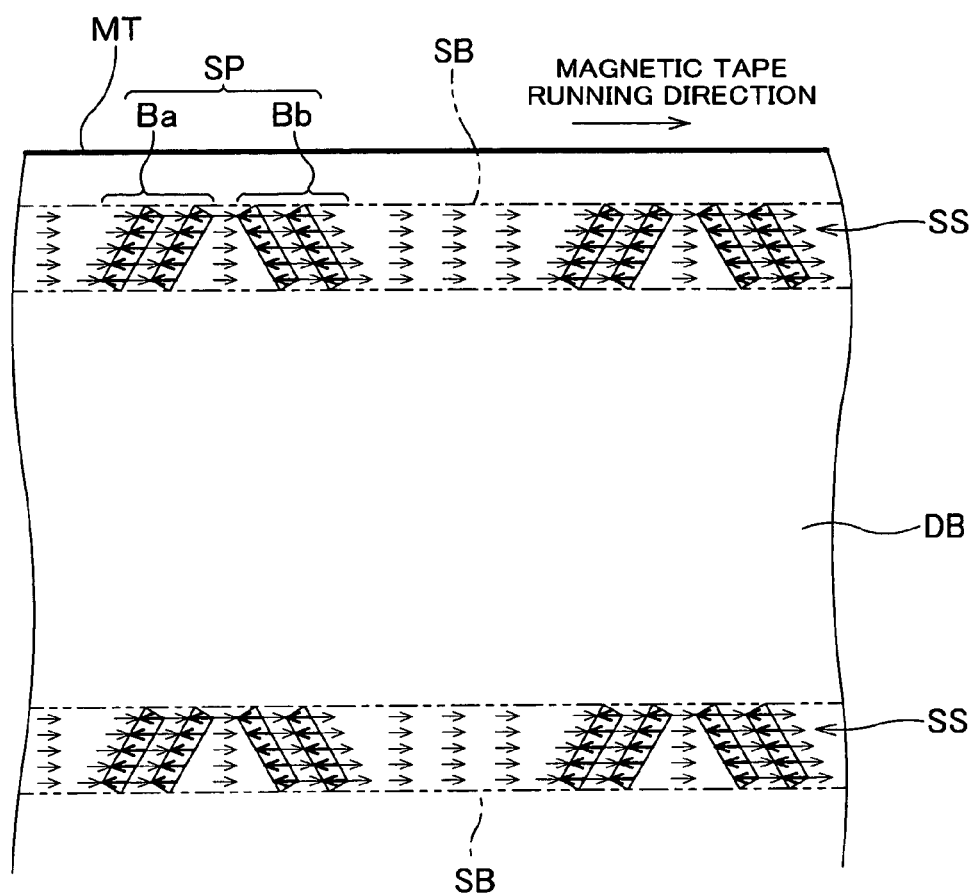
FIG. 12A is an enlarged plane view depicting a magnetized state of the DC-magnetized magnetic tape and FIG. 12B is a view depicting a voltage signal being read from the servo signal of the magnetic tape of FIG. 12A.
Figure 12B:
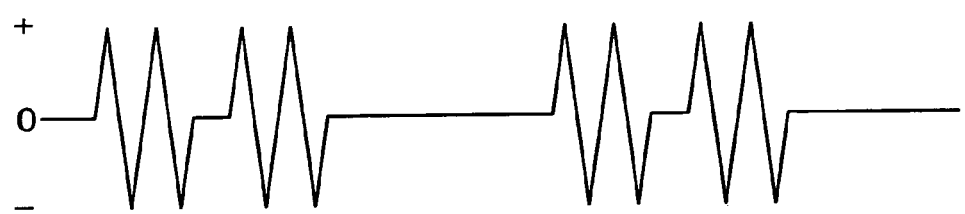

As shown in FIG. 10, the cartridge memory 2 contains the output level data indicating the respective output levels of the servo signals S1 to S5 (only S1 is shown) written on the magnetic tape MT. Thereinafter, the description will be continued, assuming that the typical output levels of the servo signals in a conventional magnetic tape cartridge are 100%, and the typical output levels of the servo signals S1 to S5 in this embodiment are 200%.

The magnetic tape drive 4 includes, as main components, a memory information reading means 41 and a controller 42, in addition to the servo read head 31b, the output level correcting unit (correcting means) 33 and the auto gain controller 34. The memory information reading means 41 reads the output level data from the cartridge memory 2, and outputs it to the output level correcting unit 33. The controller 42 controls a record/reproduction head (not shown) for recording/reproducing data, based on the servo signal S1 of which output level is fine-adjusted to 100% by the auto gain controller 34.

Next, a description will be given below of a method by which the magnetic tape drive 4 reads the servo signal S1. As shown in FIG. 10, once the magnetic tape cartridge 1 is set in the magnetic tape drive 4, the servo read head 31b reads the servo signal S1 from the magnetic tape MT (servo signal reading process) and, then outputs the servo signal S1 having been read to the output level correcting unit 33. Thereinafter, the description will be continued, assuming that the servo signal S1 is normally read by the servo read head 31b, and its output level is 200%.

Simultaneously with the servo signal reading process, the memory information reading means 41 reads the output level data (200%) from the cartridge memory 2 (output level data reading process), and then, outputs the data to the output level correcting unit 33. Subsequently, the output level correcting unit 33 determines a constant (100/200) in accordance with the received output level data (200%). Further, the output level correcting unit 33 attenuates the output level (200%) of the received data to 100%, based on the constant (correcting process) and, then outputs the data to the auto gain controller 34.

The auto gain controller 34 fine-adjusts the output level of the data being corrected and outputted by the output level correcting unit 33 to 100% (fine adjusting process) and, then outputs the data to the controller 42. Note that, if it receives the data of whose level is 100%, then the auto gain controller 34 does not fine-adjust the data, and maintain the data as it is, as already described. Finally, the controller 42 controls a record/reproduction head (not shown), based on the servo signal S1 of which level has been fine-adjusted to an appropriate level (100%) by the auto gain controller 34.

The above description has been given, provided that the servo signal S1 is normally read. However, for example, if the output level of the servo signal S1, which is read by the servo read head 31b, is 160% by accident, then the output level (160%) is corrected to 80%, based on the constant (100/200). In other words, without the output level correcting unit 33, etc., a magnetic tape-drive disables the appropriate control of the controller 42, when the output level is 200% or 160% as described above, because the output level falls outside the adjustable range (50% to 150%). In contrast, the magnetic tape drive according to this embodiment can read the servo signal even when the output level is 200% or 160%, because the output level correcting unit 33, etc. amplify the output level to a level within an adjustable range of the auto gain controller 34.

In conclusion, following effects can be produced in the second embodiment. With the output level data contained in the cartridge memory 2, the magnetic tape drive 4 can recognize the typical level of the servo signal S1 and normally read it. Accordingly, even when it reads different types of magnetic tape cartridges, the magnetic tape drive 4 can recognize the respective output levels (200%) of these magnetic tape cartridges, and adjust these output levels (200%) to an appropriate level.

As described above, the second embodiment has been described, but the present invention is not limited to this embodiment, and can be implemented with various embodiments. In these first and second embodiments, the output level data is contained in the servo signal S1 or the cartridge memory 2, so that a magnetic tape drive can record/reproduce different types of magnetic tape cartridges, but the present invention is not limited to this. For example, a notch or a projection indicating that the servo bands are DC-erased is provided on a case of a magnetic tape cartridge, so that the effect similar to that of these embodiments can be achieved.

In this case, it is necessary to quantify how the output level is varied depending on whether the servo bands are DC-erased, beforehand by experiment, etc, and to determine the constant. Further, a magnetic tape drive which records/reproduces data on/from such a magnetic tape cartridge needs to have a sensing means that senses whether the magnetic tape cartridge has a notch or the like, and a correcting means that corrects the output level, based on the constant, when the sensing means senses the notch and the like.

In these embodiments, the present invention is applied to a magnetic tape cartridge in which the servo bands are DC-erased. However, the present invention can also be applied to the magnetic tape cartridge in which the servo bands are not DC-erased.

From the aforementioned explanation, those skilled in the art ascertain the essential characteristics of the present invention and can make the various modifications and variations to the present invention to adapt it to various usages and conditions without departing from the spirit and scope of the claim.

What is claimed is:

1. A magnetic tape cartridge comprising:
   a magnetic tape comprising:
      a servo band, on which a servo signal for controlling tracking of a magnetic head is written, the servo signal containing output level data that indicates an output level of the servo signal itself.

2. A magnetic tape cartridge according to claim 1,
   wherein the servo signal includes pairs of linear patterns, each pair of which are not parallel to each other, and
   wherein the output level data is produced in the servo signal by shifting respective positions of the pairs of linear patterns from one another along a long side of the magnetic tape.

3. A magnetic tape cartridge according to claim 2,
   wherein the servo band is formed by magnetizing the magnetic tape in one direction along a long side of the magnetic tape, and
   wherein the servo signal is written to the servo band by magnetizing the servo band in the opposite direction.

4. A servo writer being used for producing the magnetic tape being included in the magnetic tape cartridge of claim 2, the servo writer comprising:

a magnetic tape running system for running the magnetic tape, comprising:
　a supply reel for feeding the magnetic tape; and
　a take-up reel for winding the magnetic tape being fed from the supply reel;
a servo signal write head for writing the servo signal on the servo band of the magnetic tape, while being in contact with the magnetic tape;
a controller for encoding the output level data indicating the output level of the servo signal; and
a pulse generation circuit for receiving the encoded data from the controller, for converting the received data into a record pulse current, and for supplying the converted current to a coil in the servo signal write head.

5. A magnetic tape drive comprising:
a servo signal read head for reading the servo signal having been written on the magnetic tape in the magnetic tape cartridge of claim 2; and
a fine-adjusting means for fine-adjusting an output level of the servo signal to a predetermined level,
the magnetic tape drive further comprising:
a servo signal decoder for decoding the servo signal having been read by the servo signal read head, and for extracting the output level data from the decoded servo signal; and
a correcting means for correcting the output level of the servo signal, based on the output level data, and for outputting the servo signal to the fine-adjusting means.

6. A method for reading a servo signal, comprising:
a servo signal reading process for reading the servo signal having been written on the magnetic tape in the magnetic tape cartridge of claim 2;
a fine-adjusting process for fine-adjusting, to a predetermined level, the output level of the servo signal having been read in the servo signal reading process;
a servo signal decoding process for decoding the servo signal having been read in the servo signal reading process, and for extracting the output level data from the servo signal; and
a correcting process for correcting the output level of the servo signal, based on the output level data having been extracted in the servo signal decoding process,
wherein the servo signal decoding process and the correcting process are performed after the servo signal reading process and before the fine-adjusting process.

7. A magnetic tape cartridge according to claim 1,
wherein the servo signal includes pairs of linear patterns, each pair of which are not parallel to each other, and
wherein the output level data is produced in the servo signal by varying respective widths of the pairs of linear patterns.

8. A magnetic tape cartridge according to claim 7,
wherein the servo band is formed by magnetizing the magnetic tape in one direction along a long side of the magnetic tape, and
wherein the servo signal is written to the servo band by magnetizing the servo band in the opposite direction.

9. A servo writer being used for producing the magnetic tape being included in the magnetic tape cartridge of claim 7, the servo writer comprising:
a magnetic tape running system for running the magnetic tape, comprising:
　a supply reel for feeding the magnetic tape; and
　a take-up reel for winding the magnetic tape being fed from the supply reel;
a servo signal write head for writing the servo signal on the servo band of the magnetic tape, while being in contact with the magnetic tape;
a controller for encoding the output level data indicating the output level of the servo signal; and
a pulse generation circuit for receiving the encoded data from the controller, for converting the received data into a record pulse current, and for supplying the converted current to a coil in the servo signal write head.

10. A magnetic tape drive comprising:
a servo signal read head for reading the servo signal having been written on the magnetic tape in the magnetic tape cartridge of claim 7; and
a fine-adjusting means for fine-adjusting an output level of the servo signal to a predetermined level,
the magnetic tape drive further comprising:
a servo signal decoder for decoding the servo signal having been read by the servo signal read head, and for extracting the output level data from the decoded servo signal; and
a correcting means for correcting the output level of the servo signal, based on the output level data, and for outputting the servo signal to the fine-adjusting means.

11. A method for reading a servo signal, comprising:
a servo signal reading process for reading the servo signal having been written on the magnetic tape in the magnetic tape cartridge of claim 7;
a fine-adjusting process for fine-adjusting, to a predetermined level, the output level of the servo signal having been read in the servo signal reading process;
a servo signal decoding process for decoding the servo signal having been read in the servo signal reading process, and for extracting the output level data from the servo signal; and
a correcting process for correcting the output level of the servo signal, based on the output level data having been extracted in the servo signal decoding process,
wherein the servo signal decoding process and the correcting process are performed after the servo signal reading process and before the fine-adjusting process.

12. A magnetic tape cartridge according to claim 1,
wherein the servo band is formed by magnetizing the magnetic tape in one direction along a long side of the magnetic tape, and
wherein the servo signal is written to the servo band by magnetizing the servo band in the opposite direction.

13. A magnetic tape drive comprising:
a servo signal read head for reading the servo signal having been written on the magnetic tape in the magnetic tape cartridge of claim 12; and
a fine-adjusting means for fine-adjusting an output level of the servo signal to a predetermined level,
the magnetic tape drive further comprising:
a servo signal decoder for decoding the servo signal having been read by the servo signal read head, and for extracting the output level data from the decoded servo signal; and
a correcting means for correcting the output level of the servo signal, based on the output level data, and for outputting the servo signal to the fine-adjusting means.

14. A method for reading a servo signal, comprising:
a servo signal reading process for reading the servo signal having been written on the magnetic tape in the magnetic tape cartridge of claim 12;

a fine-adjusting process for fine-adjusting, to a predetermined level, the output level of the servo signal having been read in the servo signal reading process;

a servo signal decoding process for decoding the servo signal having been read in the servo signal reading process, and for extracting the output level data from the servo signal; and a correcting process for correcting the output level of the servo signal, based on the output level data having been extracted in the servo signal decoding process, wherein the servo signal decoding process and the correcting process are performed after the servo signal reading process and before the fine-adjusting process.

15. A servo writer being used for producing the magnetic tape being included in the magnetic tape cartridge of claim 1, the servo writer comprising:

a magnetic tape running system for running the magnetic tape, comprising:
  a supply reel for feeding the magnetic tape; and
  a take-up reel for winding the magnetic tape being fed from the supply reel;

a servo signal write head for writing the servo signal on the servo band of the magnetic tape, while being in contact with the magnetic tape;

a controller for encoding the output level data indicating the output level of the servo signal; and a pulse generation circuit for receiving the encoded data from the controller, for converting the received data into a record pulse current, and for supplying the converted current to a coil in the servo signal write head.

16. A magnetic tape drive comprising:

a servo signal read head for reading the servo signal having been written on the magnetic tape in the magnetic tape cartridge of claim 1; and a fine-adjusting means for fine-adjusting an output level of the servo signal to a predetermined level, the magnetic tape drive further comprising:

a servo signal decoder for decoding the servo signal having been read by the servo signal read head, and for extracting the output level data from the decoded servo signal; and a correcting means for correcting the output level of the servo signal, based on the output level data, and for outputting the servo signal to the fine-adjusting means.

17. A method for reading a servo signal, comprising:

a servo signal reading process for reading the servo signal having been written on the magnetic tape in the magnetic tape cartridge of claim 1;

a fine-adjusting process for fine-adjusting, to a predetermined level, the output level of the servo signal having been read in the servo signal reading process;

a servo signal decoding process for decoding the servo signal having been read in the servo signal reading process, and for extracting the output level data from the servo signal; and a correcting process for correcting the output level of the servo signal, based on the output level data having been extracted in the servo signal decoding process, wherein the servo signal decoding process and the correcting process are performed after the servo signal reading process and before the fine-adjusting process.

18. A magnetic tape according to claim 1, wherein the servo signal contains pieces of longitudinal positional information which are repeatedly recorded thereon along the long side of the magnetic tape, and wherein the output level of the servo signal is contained in the pieces of longitudinal positional information.

19. A magnetic tape cartridge comprising:

a magnetic tape including a servo band, on which a servo signal for controlling tracking of a magnetic head is written;

a cartridge memory being a record medium different from the magnetic tape; and the cartridge memory, on which output level data indicating an output level of the servo signal is written.

20. A magnetic tape drive comprising:

a memory information reading means for reading the output level data having been written on the cartridge memory in the magnetic tape cartridge of claim 19;

a fine-adjusting means for fine-adjusting an output level of the servo signal to a predetermined level; and a correcting means for correcting the output level of the servo signal, based on the output level data, and for outputting the servo signal to the fine-adjusting means.

21. A method for reading a servo signal, comprising:

a servo signal reading process for reading the servo signal having been written on the magnetic tape in the magnetic tape cartridge of claim 19;

a fine-adjusting process for fine-adjusting, to a predetermined level, the output level of the servo signal having been read in the servo signal reading process;

a output level data reading process for reading the output level data from the cartridge memory; and a correcting process for correcting the output level of the servo signal, based on the output level data having been read the output level data reading process, wherein the output level data reading process and the correcting process are performed before the fine-adjusting process.

* * * * *